(12) United States Patent
Niki et al.

(10) Patent No.: US 11,679,430 B2
(45) Date of Patent: Jun. 20, 2023

(54) METHOD OF CORRECTING BEND OF JOINT TYPE-TURBINE ROTOR

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takahiro Niki, Kanagawa (JP); Tsuyoshi Ogawa, Kanagawa (JP); Kenji Kamimura, Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 75 days.

(21) Appl. No.: 17/103,508

(22) Filed: Nov. 24, 2020

(65) Prior Publication Data
US 2021/0220891 A1 Jul. 22, 2021

(30) Foreign Application Priority Data
Jan. 22, 2020 (JP) .............................. JP2020-008123

(51) Int. Cl.
*B21D 3/16* (2006.01)
*F16H 41/28* (2006.01)
*B21D 53/84* (2006.01)
*B23P 6/00* (2006.01)
*B21D 53/26* (2006.01)

(52) U.S. Cl.
CPC ............... *B21D 3/16* (2013.01); *B21D 53/84* (2013.01); *B23P 6/002* (2013.01); *F16H 41/28* (2013.01); *B21D 53/267* (2013.01)

(58) Field of Classification Search
CPC ...... F01D 5/063; F05D 2230/40; F16H 41/28; B23P 6/002; B21D 53/84; B21D 53/267; B21D 3/16
See application file for complete search history.

(56) References Cited

FOREIGN PATENT DOCUMENTS

| JP | H11-230733 A | 8/1999 |
|---|---|---|
| JP | 2001-317301 A | 11/2001 |
| JP | 2013-204082 A | 10/2013 |
| JP | 2016-053349 A | 4/2016 |

*Primary Examiner* — Moshe Wilensky
(74) *Attorney, Agent, or Firm* — Foley & Lardner LLP

(57) ABSTRACT

According to an embodiment, a method of correcting a bend of a joint type-turbine rotor comprises: measuring displacement of a convex portion of the bend at a joined portion of the joint type-turbine rotor or displacement of a surface opposite to the convex portion in a circumferential direction of the joint type-turbine rotor; heating the convex portion; and cooling the joined portion after the step of heating. The steps of heating and cooling are performed during the step of measuring.

7 Claims, 6 Drawing Sheets

METHOD OF CORRECTING BEND OF JOINT TYPE-TURBINE ROTOR

CROSS-REFERENCE TO RELATED APPLICATION

This application is based upon and claims the benefit of priority from Japanese Patent Application No. 2020-008123 filed on Jan. 22, 2020, the entire content of which is incorporated herein by reference.

FIELD

Embodiments of this invention relate to a method of correcting a bend of a joint type-turbine rotor.

BACKGROUND

In recent years, a joint type-turbine rotor, which is joined for example by welding, has been employed to reduce a manufacturing cost of a turbine rotor and to reduce the size of the turbine rotor by eliminating coupling. Such joint type-turbine rotor is disclosed in Japanese Patent Application Laid-Open Publication No. 2013-204082, the entire content of which is incorporated herein by reference.

Operation under the conditions that deviate from normal conditions, use over time and the like bring a risk of bending of a welded turbine rotor.

In general, if a turbine rotor bends, countermeasures include: for example, a journal correction process, that is, a correction process of a connection portion with a bearing; or addition of balance weights for locally adjusting the weight of the turbine rotor.

For example, in the case of a joint type-turbine rotor in which different materials are welded together, alloying elements are generally evenly distributed in a welded portion, but there may be a deviation in some of the alloying elements, and amount of the bend may increase with age. Though countermeasures against bending of the turbine rotor includes the journal correction process or the addition of the balance weight as described above, these conventional measures may not be able to cover all of the problem, and available range has a limit.

DETAILED DESCRIPTION

Therefore, an object of the embodiment of the present invention is to provide a method of correcting a bend of a joined portion in a joint type-turbine rotor when the bend occurs.

According to an aspect of an embodiment, there is provided a method of correcting a bend of a joint type-turbine rotor, comprising: measuring displacement of a convex portion of the bend at a joined portion of the joint type-turbine rotor or displacement of a surface opposite to the convex portion in a circumferential direction of the joint type-turbine rotor; heating the convex portion; and cooling the joined portion after the step of heating, wherein the steps of heating and cooling are performed during the step of measuring.

With reference to the accompanying drawings, a method of correcting a bend of a joint type-turbine rotor according to embodiments of the present invention will be described. The parts that are the same as, or similar to, each other are represented by the same reference symbols and will not be described repeatedly.

Figure 1:
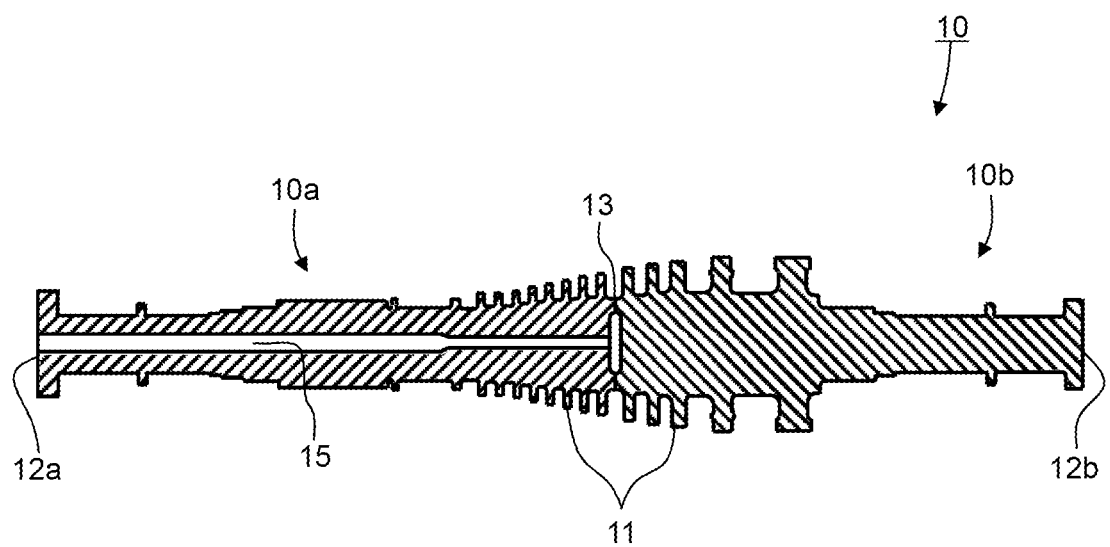
FIG. 1 is a longitudinal sectional view illustrating a configuration of a joint type-turbine rotor.
Figure 2:
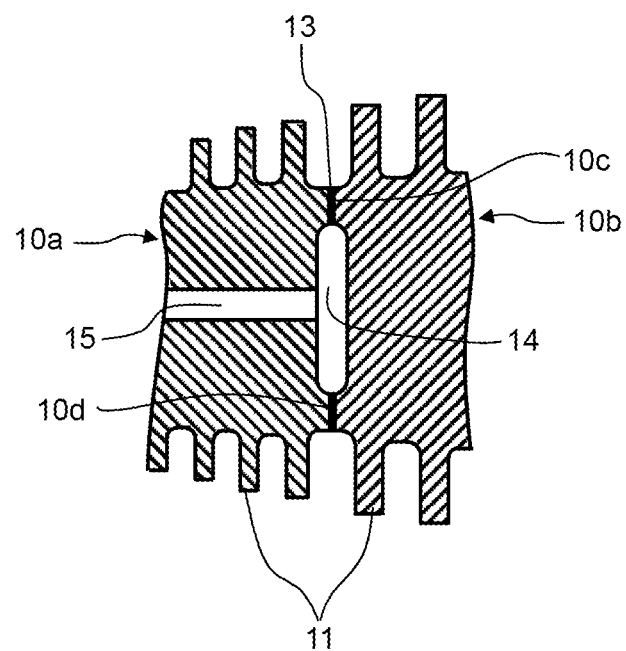
FIG. 2 is a longitudinal partial sectional view illustrating a vicinity of a joined portion of the joint type-turbine rotor.

FIG. 1 is a longitudinal sectional view illustrating a configuration of a joint type-turbine rotor 10. FIG. 2 is a longitudinal partial sectional view illustrating a vicinity of a joined portion 13 of the joint type-turbine rotor 10.

The joint type-turbine rotor 10 means a turbine rotor in which a plurality of rotors are joined to each other in an axial direction. In a concrete structure, a first rotor 10*a* and a second rotor 10*b* are joined at butt portions of a first rotor annular portion 10*c* and a second rotor annular portion 10*d*, forming the joined portion 13 between them in the case illustrated in FIG. 1. The joined portion 13 is, for example, a welded portion in welding.

Here, joining is performed by, for example, welding, pressure welding, and so on, but other methods may also be used.

Materials of the first rotor 10*a* and the second rotor 10*b* may be different from each other or may be the same.

For example, it is important to ensure high-temperature creep strength on a high-temperature side such as a high-and-intermediate-pressure turbine to prevent creep phenomenon. On the other hand, it is important to ensure tensile strength and toughness in a low-pressure turbine because centrifugal force is high due to longer blades. Thus, a wide variety of materials are used, ranging from low alloy steels to high chromium materials such as 12Cr steel, for example, even in the case of chromium-molybdenum-vanadium steels. Alternatively, nickel and other metals are added to ensure high tensile strength and toughness, such as 3.5 Ni—Cr—Mo—V steel, as a high strength material.

The first rotor 10a and the second rotor 10b may be each made of different materials and then joined together. Alternatively, to relaxing requirements of manufacturing equipment and processing steps, the same material may be used, and the first rotor 10a and the second rotor 10b may be manufactured independently and then joined together.

The joint type-turbine rotor 10 has a bag-like structure with a bag-shaped hollow portion 14 due to the joining of the first rotor 10a and the second rotor 10b. That is, because of the butt-joining of the first rotor annular portion 10c of the first rotor 10a and the second rotor annular portion 10d of the second rotor 10b, the joined portion 13 of the joint type-turbine rotor 10 is formed by the annular portion forming the bag-shaped hollow portion 14.

The first rotor 10a has a center hole 15 that penetrates from the bag-shaped hollow portion 14 to a first end portion 12a along a center axis, and the bag-shaped hollow portion 14 is open to an outside through the center hole 15.

The turbines that use the joint type-turbine rotor 10 are, for example, steam turbines and gas turbines, but they may also be other turbines.

Using the joint type-turbine rotor as described above creates a risk of a bend of the joint type-turbine rotor as a result of operation including operating conditions that deviate from normal conditions and use over time. A method of correcting the bend of the joint type-turbine rotor in the present embodiment is to solve such a problem.

Figure 3:
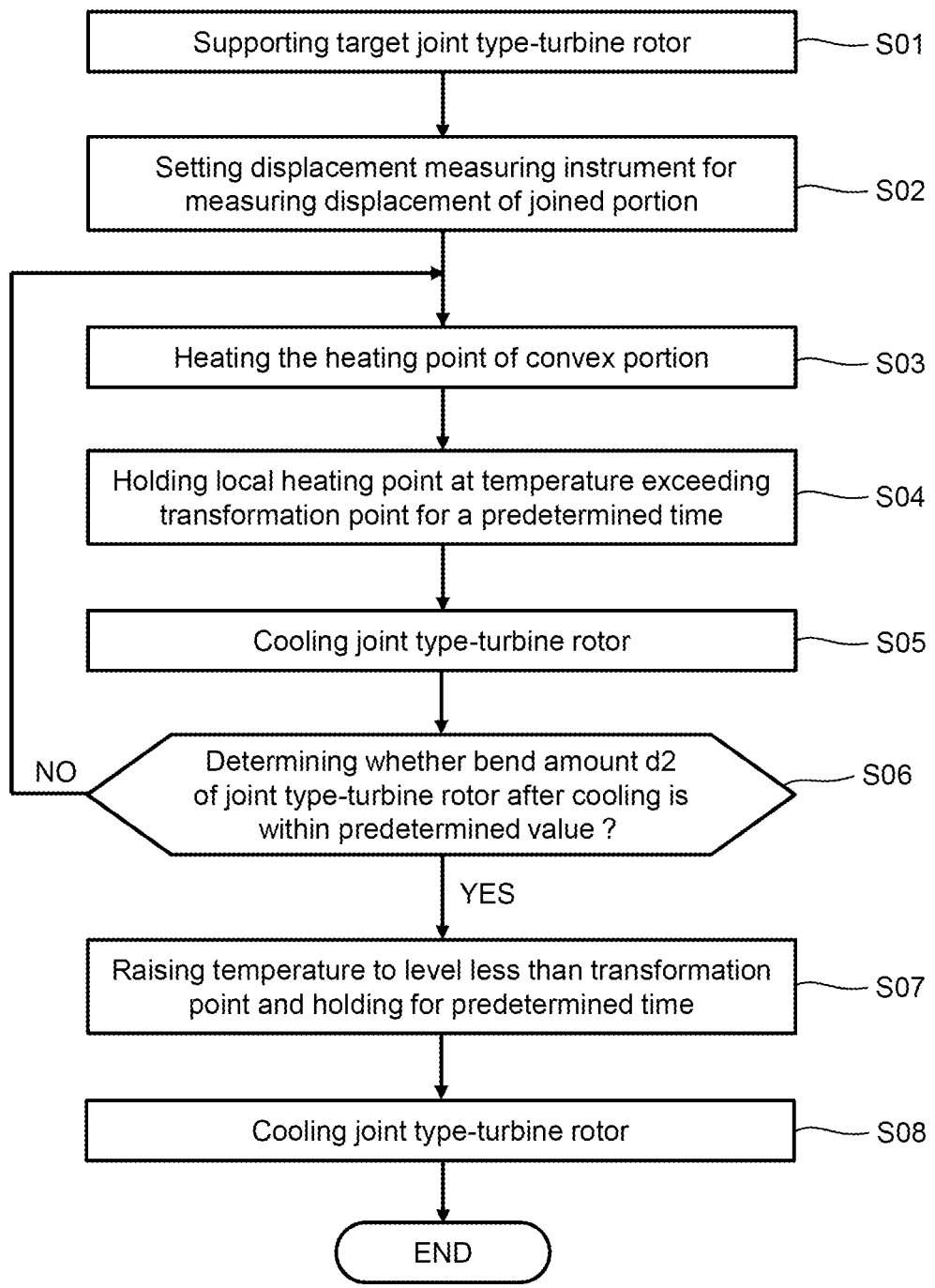
FIG. 3 is a flowchart illustrating a procedure of a method of correcting the bend of the joint type-turbine rotor according to an embodiment.

FIG. 3 is a flowchart illustrating a procedure of the method of correcting the bend of the joint type-turbine rotor according to the embodiment. The correction method will be described in sequence according to the procedure illustrated in FIG. 3.

Figure 4:
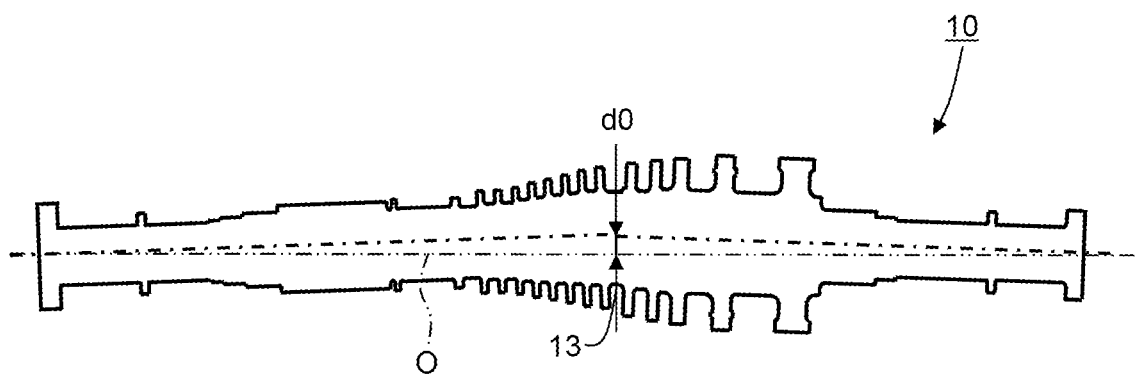
FIG. 4 is a conceptual view illustrating an initial bent state of the joint type-turbine rotor 10 subjected to the method of correcting the bend of the joint type-turbine rotor according to the embodiment.

FIG. 4 is a conceptual view illustrating an initial bent state of the joint type-turbine rotor 10 subjected to the method of correcting the bend of the joint type-turbine rotor according to the embodiment. FIG. 4 illustrates the case where a maximum bend direction, that is, a convex portion side, is an upside in the drawing.

Displacement or deviation of a center axis at the joined portion 13 of the joint type-turbine rotor 10 from a center axis in an unbent state (hereinafter, referred to as a straight axis) is referred to as a bend amount d. The state illustrated in FIG. 4 is set to be a state with a bend amount d0.

As a first step of the method of correcting the bend of the joint type-turbine rotor in the embodiment, the target joint type-turbine rotor 10 is supported (step S01).

Figure 5:
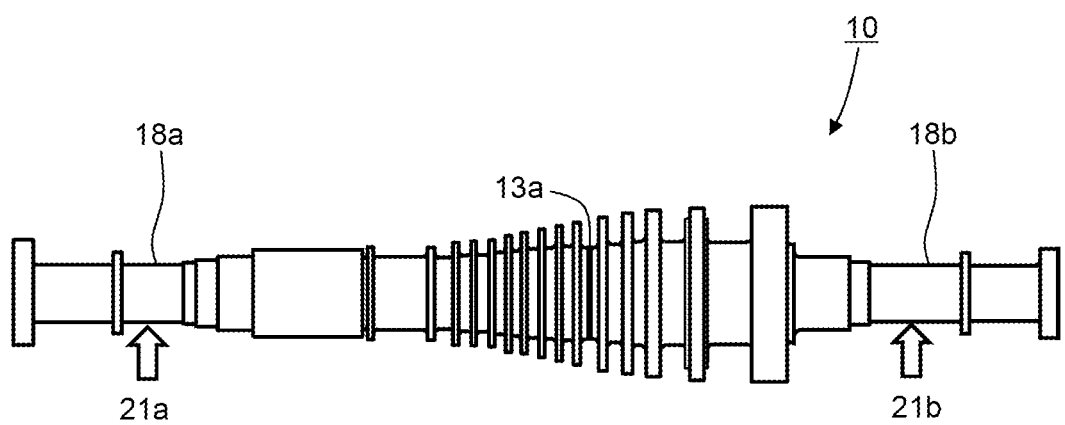
FIG. 5 is a conceptual view of the joint type-turbine rotor illustrating a state in step S01 of the method of correcting the bend of the joint type-turbine rotor according to the embodiment.

FIG. 5 is a conceptual view of the joint type-turbine rotor 10 illustrating a state in step S01 of the method of correcting the bend of the joint type-turbine rotor according to the embodiment.

The joint type-turbine rotor 10 is supported on both sides in an axial direction across a rotor iron core. Points to be supported are, for example, supported portions 18a, 18b, which are supported by bearings in an assembly state of a turbine using the joint type-turbine rotor 10, and the supported portions 18a, 18b are respectively supported using support portions 21a, 21b, which substitute for the bearings.

Here, in the supported state, a direction of a convex portion 13a of the joined portion 13 may be upward, downward, or lateral. When the joint type-turbine rotor 10 is installed with the convex portion 13a facing downward, heating on the convex portion 13a side could affect to an upper portion, or imbalance in a thermal effect range in a circumferential direction may occur during a heating stage described below. If there is such a concern, the convex portion 13a of the joined portion 13 is preferably supported to face upward as illustrated in FIG. 5.

Next, a displacement measuring instrument 31 for measuring the displacement of the joined portion 13 is set up (step S02).

Figure 6:
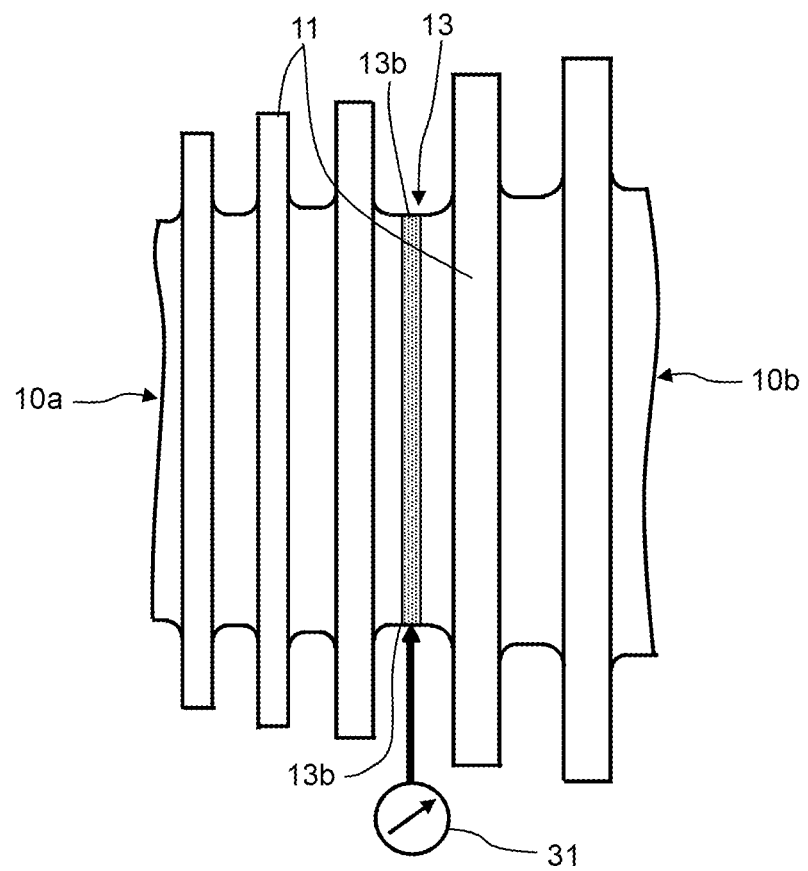
FIG. 6 is a detailed partial side view of the joint type-turbine rotor illustrating a state in step S02 of the method of correcting the bend of the joint type-turbine rotor according to the embodiment.

FIG. 6 is a detailed partial side view of the joint type-turbine rotor 10 illustrating a state in step S02 of the method of correcting the bend of the joint type-turbine rotor according to the embodiment.

A measurement point of displacement is either a portion opposite to the convex portion 13a side in the circumferential direction, that is, a portion displaced 180 degrees in the circumferential direction, that is, a portion with the greatest displacement on a concave portion 13b side, or the convex portion 13a side. However, it is preferable to measure the concave portion 13b as illustrated in FIG. 6, because of restrictions such that the measurement cannot be made during heating when measuring the convex portion 13a side.

Here, a dial gauge type is exemplified as the displacement measuring instrument 31 in FIG. 6, but is not limited thereto. For example, it may be a strain gauge type displacement measuring instrument or even a laser displacement gauge. By grasping an initial bend amount, the bend amount in each process such as heating or cooling described below can be grasped by measuring the displacement with the displacement measuring instrument 31.

Next, local a heating point 41 (FIG. 8) of the convex portion is heated (step S03).

Figure 7:
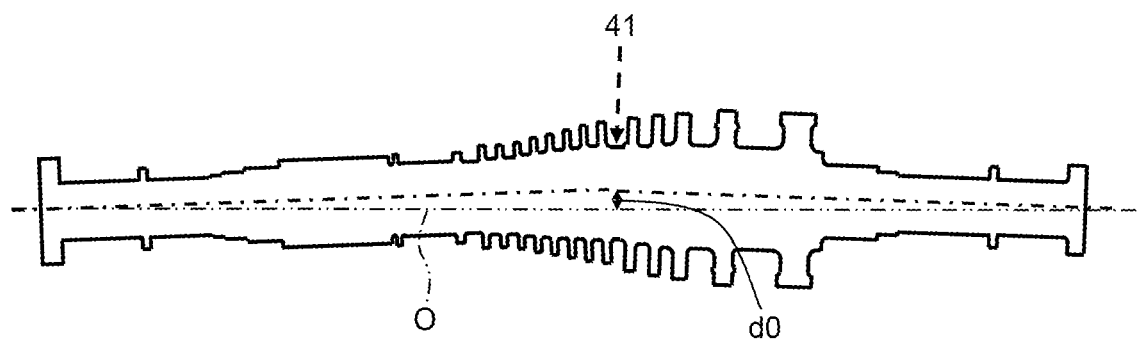
FIG. 7 is a conceptual view of the joint type-turbine rotor illustrating heating points in the method of correcting the bend of the joint type-turbine rotor according to the embodiment.
Figure 8:
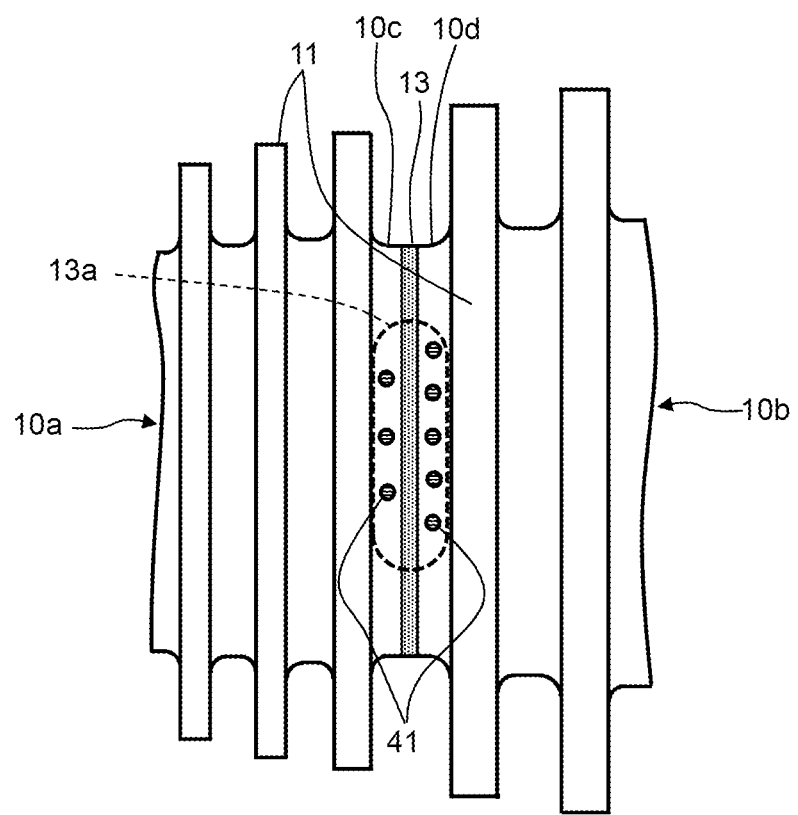
FIG. 8 is a partial plan view of the joint type-turbine rotor illustrating the local heating points in the method of correcting the bend in the joint type-turbine rotor according to the embodiment.

FIG. 7 is a conceptual view of the joint type-turbine rotor 10 illustrating heating points in the method of correcting the bend of the joint type-turbine rotor according to the embodiment. FIG. 8 is a partial plan view of the joint type-turbine rotor illustrating the local heating points 41 in the method of correcting the bend in the joint type-turbine rotor 10 according to the embodiment. That is, FIG. 8 is a view of the convex portion 13a seen from above when the convex portion 13a faces upward.

Here, the portion which has been referred to as the convex portion 13a is the portion on a convex portion side in an area including the first rotor annular portion 10c and the second rotor annular portion 10d that sandwich the joined portion 13, as illustrated in FIG. 8. That is, the convex portion 13a is a portion having a width in a circumferential direction around the most convex portion in the circumferential direction and may be a range having an angle of circumference in the circumferential direction of, for example, about 30 degrees when seen from an axis center.

At the convex portion 13a, one point is selected as the local heating point 41 in the joined portion 13 or not in the joined portion 13 itself but a point in the first rotor annular portion 10c or the second rotor annular portion 10d. FIG. 8 illustrates examples of all of those points since the heating point is changed sequentially when heating is performed in plural times, as described below.

Spot heating with a burner, high-frequency induction heating, or heating with a welding arc can be used as a method of local heating. In this step S03, the local heating is used to raise a temperature of a portion to be heated to a temperature that exceeds a transformation point of the first rotor 10a and the second rotor 10b.

Next, the local heating point 41 is held at the temperature exceeding the transformation point reached by the heating for a predetermined time (step S04).

It is preferable to use the temperature and holding time that minimize an effect on materials as long as plastic deformation occurs at the convex portion 13a because a locally heated area is generally prone to hardening and decrease in ductility is a concern.

Since such local heating heats the first rotor annular portion 10c or the second rotor annular portion 10d, which has a small heat capacity, a correction effect can be ensured with small heat input and can correct the bend even for turbine rotor materials such as 3.5 Ni—Cr—Mo—V steel, which are prone to cracking.

For steps S03, S04, caution is required in the case of the turbine rotor materials such as 3.5 Ni—Cr—Mo—V steel, which are prone to cracking. In the case of such material, cracking may be avoided by using a method of diluting a chemical composition of a base material by using a welding material with low crack sensitivity when joining the first rotor 10a and the second rotor 10b and locally heating the joined portion 13, which has the chemical composition with the low crack sensitivity.

Figure 9:
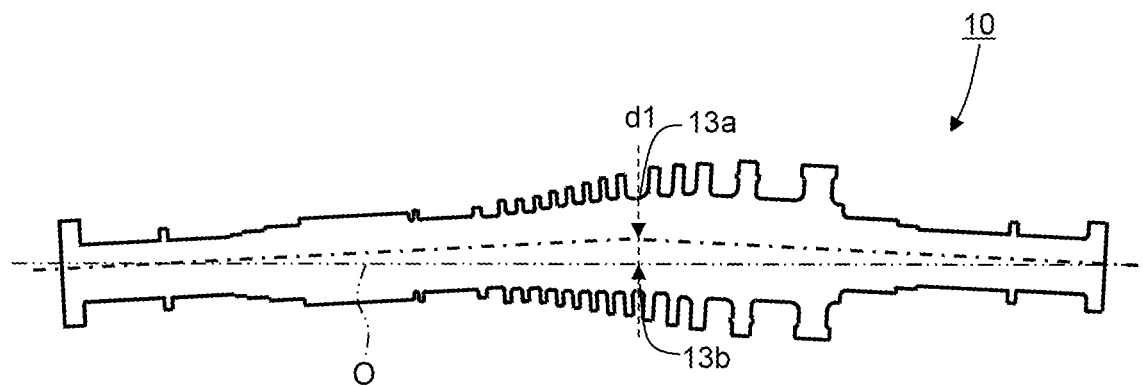
FIG. 9 is a conceptual view of the joint type-turbine rotor illustrating a state in step S04 of the method of correcting the bend of the joint type-turbine rotor according to the embodiment.

FIG. 9 is a conceptual view of the joint type-turbine rotor illustrating a state in step S04 of the method of correcting the bend of the joint type-turbine rotor according to the embodiment.

By heating the convex portion 13a, the bent state becomes a bend amount d1 larger than the initial bend amount d0. In such a deformation, the heated convex portion 13a side reaches a plastic deformation region, while the concave portion 13b, which is opposite in the circumferential direction remains in an elastic deformation region.

Next, the joint type-turbine rotor 10 is cooled (step S05). Here, the cooling is performed by means such as natural heat dissipation and air cooling. In this case, for example, a cooling temperature gradient is moderated by wrapping a heat-insulating material. This suppresses large change in properties.

Figure 10:
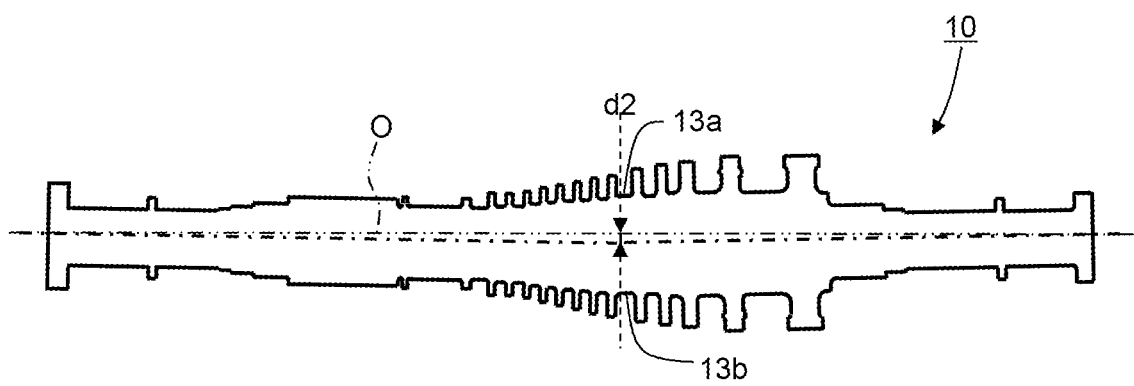
FIG. 10 is a conceptual view of the joint type-turbine rotor illustrating a state in step S05 of the method of correcting the bend of the joint type-turbine rotor according to the embodiment.

FIG. 10 is a conceptual view of the joint type-turbine rotor 10 illustrating a state in step S05 of the method of correcting the bend of the joint type-turbine rotor according to the embodiment. Due to the heating to the temperature exceeding the transformation point and the subsequent cooling, a bend amount d2 at the joined portion 13 of the joint type-turbine rotor 10 becomes a reduced value compared to the initial bend amount d0. FIG. 10 illustrates the case where a bend direction is finally reversed.

The bend amount "d" decreases due to the following reasons.

As mentioned above, the convex portion 13a side, which is heated, deforms up to inelastic region during the heating process in step S03 but deforms elastically during the cooling process in subsequent step S05. That is, the convex portion 13a side deforms in a hysteresis manner.

On the other hand, the concave portion 13b side, which is not heated, deforms elastically both during the heating process in step S03 and during the cooling process in subsequent step S05.

From the above-mentioned deformation process and the condition that the convex portion 13a side and the concave portion 13b side are integrally coupled in the joint type-turbine rotor 10, the joint type-turbine rotor 10 is displaced in the opposite bend direction from an initial direction as a balanced state after cooling. That is, the joint type-turbine rotor 10 approaches a straight-axis state. For example, by performing such an operation multiple times, the original concave portion 13b side finally changes to the convex portion side, that is, the bend becomes opposite to the original side.

Next, it is determined whether the bend amount d2 of the joint type-turbine rotor 10 after cooling is within a predetermined value (step S06).

Here, for example, a condition that an absolute value of the bend amount d2 is a predetermined value or less may be used as the predetermined value to be used as a basis for the determination. The predetermined value may be, for example, a value such as that within a range that does not affect vibration of the joint type-turbine rotor 10.

Alternatively, for example, a condition that the absolute value of the bend amount d2 is a predetermined percentage or less of the initial bend amount d0 may be used as the predetermined value to be used as the basis for the determination. In this case, for example, a value such as 20% may be used as the predetermined percentage.

Furthermore, in consideration of a possibility of similar bends after the application of the method of correcting the bend, a condition that the bend amount d is reversed in sign from the initial bend amount d0 may be added, as illustrated in FIG. 10.

When the bend amount is not determined to be within the predetermined value (step S06 NO), the process returns to step S03 and selects the local heating point 41 at another position at the convex portion 13a to perform the heating and then repeats subsequent step S04 to step S06.

When the bend amount is determined to be within the predetermined value (step S06 YES), the temperature is then raised to the level less than the transformation point and held for a predetermined time (step S07). That is, a part or the whole of the joint type-turbine rotor 10 is reheated and annealed for stress relief. The temperature is set not to reach the transformation point of the first rotor 10a and the second rotor 10b. The holding time may be under conditions of normal annealing.

Next, the joint type-turbine rotor 10 is cooled (step S08). In this step, rapid cooling is avoided as in step S05.

As described above, in the method of correcting the bend of the joint type-turbine rotor in the present embodiment, when the bend occurs at the joined portion of the joint type-turbine rotor 10, the bend can be corrected by locally heating the convex portion 13a of the joined portion 13. Since the first rotor annular portion 10c or the second rotor annular portion 10d, which has the small heat capacity, is locally heated, the correction effect can be ensured with the small heat input.

That makes it possible to correct the bend for turbine rotor materials such as 3.5 Ni—Cr—Mo—V steel that are prone to cracking.

As described above, the method of correcting the bend of the joint type-turbine rotor in the present embodiment enables effective bend correction.

Other Embodiments

While the embodiment of the present invention has been described, the embodiment is presented by way of example only and are not intended to limit the scope of the invention.

The embodiments may be combined with each other. The embodiments may be embodied in other various forms. Various omissions, replacements and changes may be made without departing from the spirit of the invention.

The above-described embodiments and variants thereof are within the scope and spirit of the invention, and are similarly within the scope of the invention defined in the appended claims and the range of equivalency thereof.

What is claimed is:

1. A method of correcting a bend of a joint type turbine rotor, comprising:

step (a) of setting a displacement measuring instrument for measuring displacement and determining a bend amount of a convex portion of the bend at a joined portion of the joint type turbine rotor or displacement of a surface opposite to the convex portion in a circumferential direction of the joint type turbine rotor;

step (b) of first determining an initial bend amount from measured displacement by the displacement measuring instrument after step (a);

step (c) of heating the convex portion;

step (d) of secondly determining the bend amount from measured displacement by the displacement measuring instrument after step (c);

step (e) of cooling the joined portion after step (c);

step (f) of thirdly determining the bend amount from measured displacement by the displacement measuring instrument after step (e); and step (g) of determining whether a bend amount of the joint type turbine rotor is within a predetermined range after step (f), wherein upon determining that the bend amount of the joint type turbine rotor is out of the predetermined range, step (c) to step (g) are performed again.

2. The method of correcting the bend of the joint type turbine rotor according to claim 1, wherein
step (c) is performed at a temperature exceeding a transformation point of material of the joint type turbine rotor.

3. The method of correcting the bend of the joint type turbine rotor according to claim 1, further comprising:
supporting the joint type turbine rotor so that the convex portion arches to its highest point vertically before step (a).

4. The method of correcting the bend of the joint type turbine rotor according to claim 1, wherein
the predetermined range is 20% or less of the initial bend amount of the joint type turbine rotor.

5. The method of correcting the bend of the joint type turbine rotor according to claim 4, wherein
a bend direction of the predetermined range is opposite to an initial bend direction.

6. The method of correcting the bend of the joint type turbine rotor according to claim 1, further comprising:
step (h) of reheating the convex portion after step (g);

step (i) of fourthly determining the bend amount from measured displacement by the displacement measuring instrument after step (h); and step (j) of recooling the joined portion after the step of reheating;

step (k) of fifthly determining the bend amount from measured displacement by the displacement measuring instrument after step (j); and step (m) of determining whether the bend amount of the joint type turbine rotor is within the predetermined range.

7. The method of correcting the bend of the joint type turbine rotor according to claim 6, wherein
step (h) is performed at a temperature less than the transformation point of material of the joint type turbine rotor.

* * * * *